March 10, 1931.  W. H. ROBERTSON  1,795,509
CASH REGISTER
Filed Aug. 31, 1928   4 Sheets-Sheet 1

Inventor
William H. Robertson
By Earl Beust
Ralph E. Warfield
His Attorneys

March 10, 1931.  W. H. ROBERTSON  1,795,509
CASH REGISTER
Filed Aug. 31, 1928   4 Sheets-Sheet 2

Inventor
William H. Robertson
By *Earl Beust*
*Ralph B. Warfield*
His Attorneys

March 10, 1931. W. H. ROBERTSON 1,795,509
CASH REGISTER
Filed Aug. 31, 1928 4 Sheets-Sheet 3
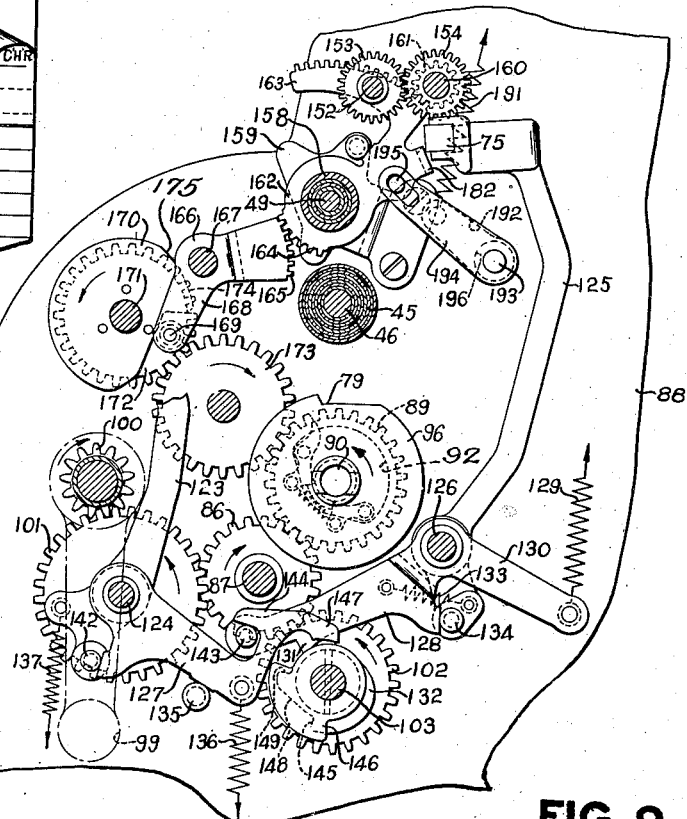
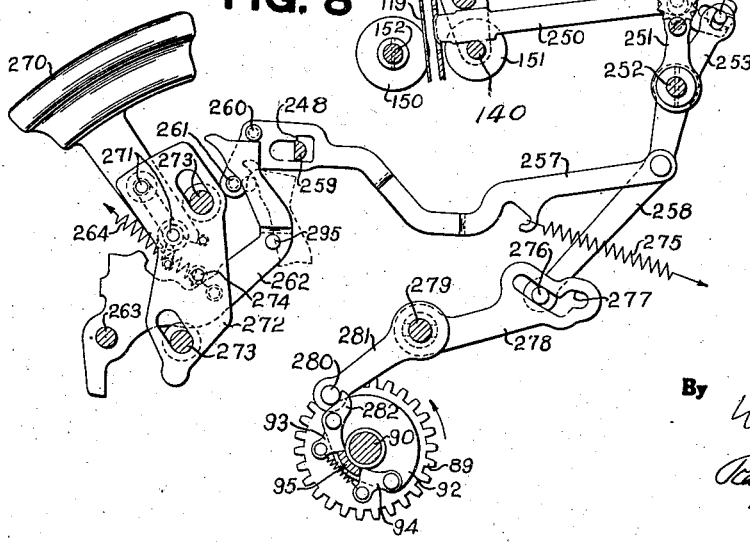
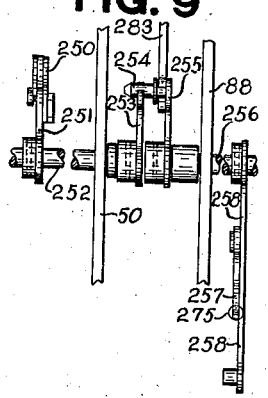
Inventor
William H. Robertson
By
His Attorneys March 10, 1931.  W. H. ROBERTSON  1,795,509
CASH REGISTER
Filed Aug. 31, 1928   4 Sheets-Sheet 4

Inventor
William H. Robertson
By Hearl Beust
Ralph S. Warfield
His Attorneys

Patented Mar. 10, 1931

1,795,509

UNITED STATES PATENT OFFICE

WILLIAM H. ROBERTSON, OF DAYTON, OHIO, ASSIGNOR TO THE NATIONAL CASH REGISTER COMPANY, OF DAYTON, OHIO, A CORPORATION OF MARYLAND

CASH REGISTER

Application filed August 31, 1928. Serial No. 303,250.

This invention relates to cash registers and like machines, and is more particularly directed to printing mechanisms for such machines.

The particular embodiment of the invention herein illustrated is adapted to be applied to machines of the type disclosed in applicant's co-pending applications for Letters Patent of the United States, Serial Nos. 106,454; 169,583 and 172,660, filed May 3, 1926, February 19, 1927, and March 4, 1927, respectively.

One object of this invention is to provide, in a printing mechanism adapted to print and issue a check or print on inserted record material, a novel means, controlled by the presence or absence of such insertable record material, to disable the check issuing mechanism.

Another object is to utilize the check ejector mechanism, normally operated at the end of the operation of the machine to discharge the check, to also feed an inserted record material between imprints, under control of such record material.

Another object is to arrange for locking the machine against operation until all the parts have resumed their normal positions.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 6 is a view of a folded sales slip for original and duplicate entries, the impressions being made directly upon both the original and duplicate sections by the printing mechanism.

Fig. 7 is a side view of the drive mechanism for the combined check ejector and slip feed device together with the detail printing and check and slip printing hammer-operating mechanism.

Fig. 8 is a detail side view of the slip feeler mechanism and its connection with the motor or starting key.

Fig. 9 is a fragmentary view in rear elevation, of the connection between the slip feeler mechanism and its restoring means.

General description

The machine selected to illustrate one form of the present invention, is fully shown in the Robertson applications, Serial Nos. 106,454; 169,583 and 172,660, above referred to, wherein are shown a keyboard having a plurality of banks of amount keys, a bank of transaction keys, a repeat key, a releasing key, and a lever to control the machine to add onto the totalizers or to clear the totalizers on which are accumulated the amounts entered into the machine under the control of the amount keys or the repeat key. These applications also disclose differential mechanism to actuate the totalizers and set up the indicators and type carriers.

While the invention is particularly adapted for use in connection with the machine disclosed in the applications mentioned above, it is to be understood that the invention disclosed hereinafter is not restricted in its use to machines of the type shown, but may be readily adapted to other machines.

The invention includes, generally, a printing mechanism having two groups of type wheels simultaneously set by the operation of the machine upon which said printing device is being used. Two printing hammers are provided to take impressions from the respective sets of type wheels, one to take the impression from one of said groups of type wheels on a detail record strip which is retained in the machine, and another to effect an impression on an issuing check or receipt from the remaining group of type wheels, which is then ejected from the machine. The second-mentioned hammer, under control of a slip feeler, disables the check feed mechanism and prints twice on an inserted slip, said slip being fed during the interval between the impressions, by the same mechanism which ejects the check or receipt from the machine. Various controls are provided for the check ejector tension rolls and other associated mechanism, all of which will be described in detail later.

Figure 1:
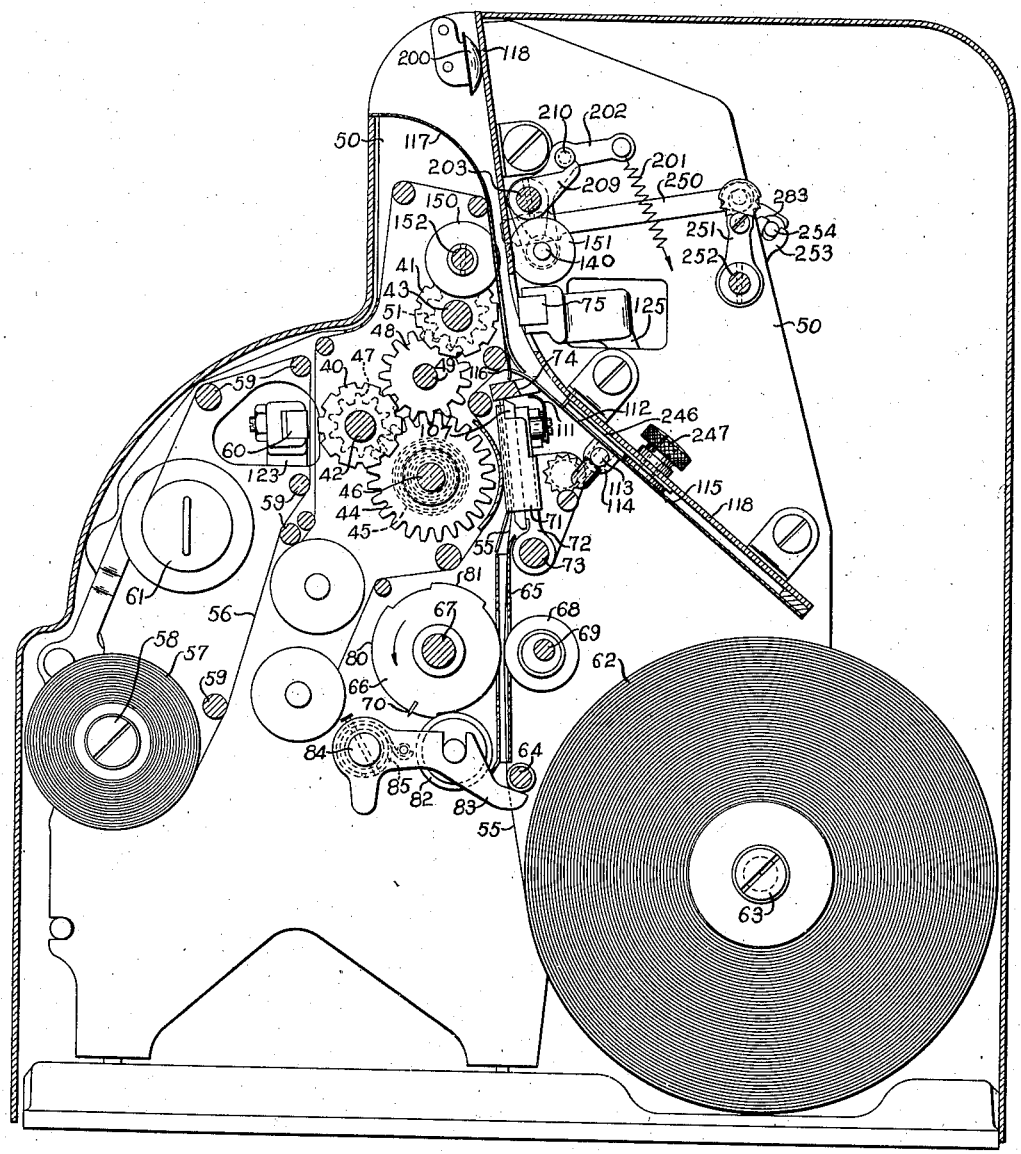
Fig. 1 is a vertical sectional view through a machine equipped with this invention, showing the parts in their normal positions.

*Type wheels.*—Two groups of type wheels 40 and 41 (Fig. 1) journaled on rods 42 and 43, respectively, are set simultaneously by differential mechanism (not shown) under the control of value determining means (also not shown) to present to the printing line types corresponding to the actuated value determining means.

Gears 44 fast on the ends of a series of nested tubes 45 surrounding a shaft 46, mesh with gears 47 fast to the respective type wheels 40, and with intermediate gears 48 journaled on a stud 49 projecting from the printer frame 50. The intermediate gears 48 mesh with gears 51 secured to the respective type wheels 41. The detail record strip 56 is printed from the group of type wheels 40, and the check and insertable slip are printed from the group of type wheels 41. The tubes 45 and gears 44 are differentially adjusted under the control of depressible keys, (not shown), thereby setting the type wheels 40 and 41 to print the amounts and transactions corresponding to the keys depressed. Certain of the type wheels 40 and 41 of each group represent the date, and certain other wheels, the serial or other designating number, and cashier number, these wheels being adjusted by means not shown herein, but which is fully illustrated and described in applicant's co-pending applications mentioned above.

*Detail strip.*—The detail strip 56 (Fig. 1) is unwound from a supply roll 57 supported on a stud 58 projecting from the printer frame 50. The detail strip passes around and is guided by pins 59 in the frame 50 so as to pass between the detail hammers 60 and type wheels 40, after which it is wound on a receiving roll 61, which is automatically turned one step at each operation of the machine, by mechanism not shown herein.

Figure 12:
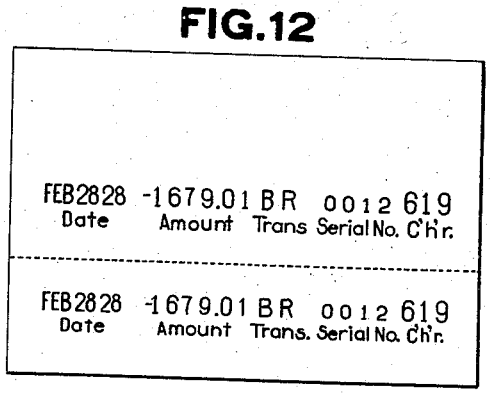
Fig. 12 is a view of the check issued by the machine, showing the duplicate imprints on the body of the check and on the stub.

*Check paper.*—The paper 55 (Fig. 1) from which the issuing checks are printed, is unwound from a large supply roll 62 mounted on a stud 63 in the printer frame 50, and passes over a guide roller 64, and thence through a chute 65. This chute is provided with opposed openings in its front and rear plates, through one of which a combined check feed and electro cylinder 66 mounted on a shaft 67, projects into the chute, a pressure roll 68 eccentrically mounted on a stud 69 in the frame 50 projecting into the chute through the opposite opening. The check feed cylinder 66 carries a perforator 70 which perforates the check strip (Fig. 12) as it is fed upwardly through the chute 65 to the printing position. After leaving the chute 65, the check strip 55 passes upwardly through a guard 71 U-shaped in cross-section, and carried by a knife-supporting arm 72 fast on a shaft 73 journaled in the printer frame 50 and in a printer front frame (not shown). The knife supporting arm 72 is adapted to rock, as will hereinafter be described, so that the upper end of the guard 71 will move into and out of register with an opening in the stationary knife 74 located just above the shearing blade 107 secured to the knife-supporting arm 72. The check strip 55 travels through a passage formed between the shearing glade 107 and the guard 71. After passing between the knife blades 107 and 74, the check strip passes between the check and slip hammer 75 and the type wheels 41 from which the impressions are made on the check, which is then severed and ejected from the machine.

The check feed cylinder 66 carries feed flanges 80 and 81 of different peripheral extents at its opposite ends, which flanges, as the cylinder 66 rotates in a counter-clockwise direction in a manner hereinafter described, successively press against the pressure roll 68 to advance the check strip 55 therebetween. At points in longitudinal alinement with the feed flanges 80 and 81, the feed cylinder 66 carries electros (not shown) which, as the cylinder 66 rotates, successively contact with an ink roller 82 mounted in a pair of arms 83 pivotally supported on a stud 84 in the printer frame 50, after which the electros pass over the check as it is fed, making an impression thereon. A spring 85 coiled about the stud 84 constantly urges the ink roll 82 into contact with the electros on the cylinder 66. The upward or counter-clockwise movement of the arms 83, and consequently of the ink roll 82, is limited by the check strip guide roller 64, previously mentioned, so as to prevent unrestricted throw of the ink roll arm when the electro-cylinder 66 is removed.

*Check feed.*—The combined check feed and electro cylinder 66 is rotated to feed the check strip 55 by the following mechanism.

Figure 13:
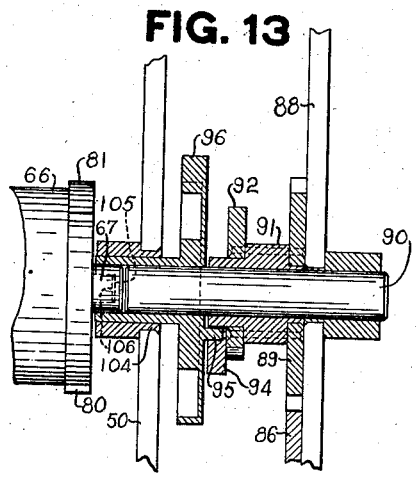
Fig. 13 is an enlarged detail horizontal sectional view looking from above and showing the drive for the feed rolls.
Figure 14:
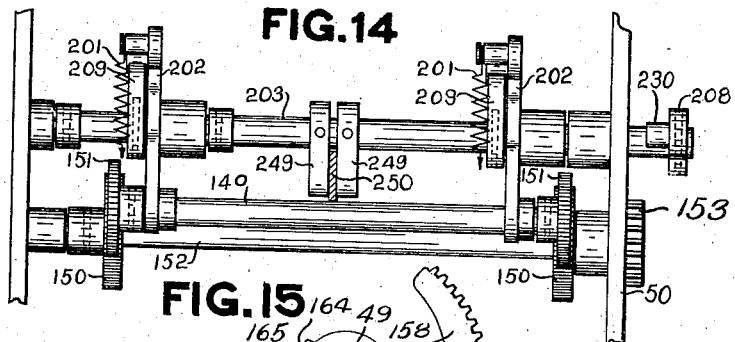
Fig. 14 is an enlarged detail plan view of the feed and tension rolls.

An idler gear 86 (Figs. 2, 7 and 13), supported on a stud 87 in a machine side frame 88, meshes with a gear 89 mounted on a rod 90, loosely supported in the side frame 88. A hub 91 (Fig. 13) connects the gear 89 to a mutilated disk 92 (Figs. 8 and 13) which carries a driving pawl 93 and a retaining pawl 94 cooperating with a lug 95 on a knife operating cam 96, also journaled on the rod 90. The idle gear 86 (Fig. 7) meshes with a gear 102 fast on a main drive shaft 103, which receives one rotation in counter-clockwise direction at each operation of the machine by an electric motor (not shown) of any conventional design, or manually, through the crank 99, pinion 100 and gear 101.

The counter-clockwise rotation of the gear 102 is communicated by the idler gear 86 to the gear 89, which also rotates once in counter-clockwise direction at each operation of the machine. The gear 89 rotates the multilated disk 92, and since the driving pawl 93 abuts against the lug 95, the knife operating cam 96 is likewise rotated in counter-clockwise direction. The hub of the groove cam disk 96 is journaled in a bearing 104 (Fig. 13) in the printer frame 50 and has clutch recesses 105 formed in the outer end thereof, to accommodate tenons 106 projecting from the adjacent end of the check feed cylinder 66, thus communicating the rotation of the gear 89 to the check feed cylinder 66, to impart thereto one complete rotation in counter-clockwise direction, as viewed in Fig. 1, at each operation of the machine.

As the check feed cylinder 66 rotates, the feed flanges 80, at the opposite ends of the cylinder, grip the check strip 55 between the pressure roll 68 and themselves and feed it upwardly through the chute 65.

It will be understood that the check strip 55 extends from the roll 62 through the chute 65 and the guard 71 with its leading edge against the under face of the stationary knife blade 74.

Means, hereinafter described, rocks the shaft 73 carrying the knife-supporting arm 72 with its guard 71 to aline the passage between the guard and the shearing blade 107 with the opening through the stationary blade 74 just prior to the feed movement, so that the end of the check strip is advanced from its position just beneath the stationary blade 74 to a position to receive the first impression.

After advancing the check strip so that the forward end thereof lies opposite the printing line of the types on the type carriers 41, the feed flanges 80 of the feed cylinder 66 escape from the check strip 55 which remains in its adjusted position to enable the printing to be effected, while the feed cylinder 66 continues its rotation.

After the first impression is made, the feed flanges 81, at the opposite ends of the feeding cylinder 66, arrive in position to grip the check strip 55 and advance it to its second impression position. Whereupon the feed flanges 81 pass out of contact with the check strip due to the continued rotation of the feed cylinder 66, leaving the forward end of the check strip 55 in its second adjusted position opposite the printing line of the type carriers 41.

The feed flanges 80 being of greater angular extent than the feed flanges 81 impart a greater advance to the check strip so as to bring its forward end to the first printing position.

During the successive feeding movements of the check strip 55, the shaft 73 maintains the passage between the guard plate 71 and the shearing blade 107 in line with the opening in the stationary knife blade 74, but as the second printing impression is being made, the forward end of the check strip is severed to form a check by the movable knife blade 107 carried by the knife-supporting arm 72 previously mentioned. After the check is severed, it is ejected from the machine by mechanism hereinafter described.

*Knife operating mechanism.*—The shearing blade 107 (Fig. 1) is mounted on the supporting arm 72 fast on the short shaft 73 journaled in the printer frame 50 and in the printer front frame (not shown). One arm of a lever 109 (Fig. 2) fast to the rear end of the shaft 73 carries an anti-friction roller 110 which projects into a cam groove formed in the face of the cam 96 journaled on the rod 90. This cam, as described above, is rotated once in counter-clockwise direction at each operation of the machine, to rock the lever 109, the knife-supporting shaft 73, and the arm 72 with its blade 107, first clockwise shortly after the commencement of the operation of the machine, to aline the end of the check strip 55 with the opening in the stationary blade 74, as well as to shift the shearing blade 107 past the stationary blade, and then counter-clockwise, near the end of the operation of the machine or at the same time the second printing impression is being made, to sever the check.

Figure 10:
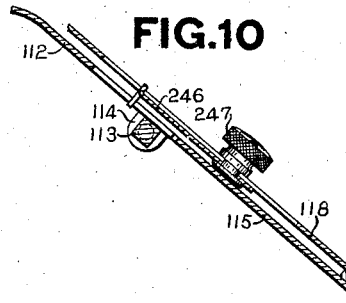
Fig. 10 is a detail sectional view through the slip chute, showing the adjustable stop.
Figure 11:
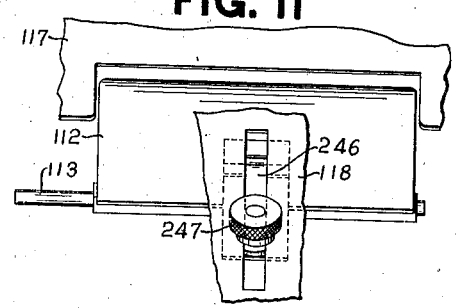
Fig. 11 is a fragmentary top plan view of the bottom plate of the slip chute, associated with the lower end of the check chute plate.

As the knife-supporting arm 72 rocks clockwise at the beginning of the operation of the machine, a finger 111 (Fig. 1) secured to the upper end thereof contacts a check chute gate 112, (Figs. 1, 10 and 11), fast on a pintle 113 pivotally supported in ears 114 projecting downwardly from the bottom plate 115 of a slip chute, and swings the gate in clockwise direction to permit the free passage of the check strip upwardly, the strip passing between a lip 116 on the lower end of the front plate 117 of the uper chute and the gate 112, and thence between the front and rear plates 117, 118 of the upper chute, to the printing line, in position to enable the check and slip printing hammer 75 to make an impression thereon from the type wheels 41.

*Impression hammers.*—Since both the detail strip impression hammer 60 and the check and slip printing hammer 75 are operated together and by the same means, they will be described together.

A lever 123 (Fig. 7) pivoted near its lower end on a stud 124 in the side frame 88 carries the detail strip printing hammer 60, and a lever 125 similarly pivoted on a stud 126 in the frame 88 carries the check and slip printing hammer 75. Operating levers 127 and 128 pivoted on the studs 124 and 126, respectively, co-operate with the lower arms of the hammer levers 123 and 125, respectively, to operate the hammers. A strong spring 129 attached to a tail 130 projecting rearwardly from the hammer-operating lever 128 holds a nose 131 on this lever in contact with the periphery of a hammer control cam 132 fast on the drive shaft 103. A spring 133 connects the check and slip printing hammer lever 125 with its operating lever 128 and tends to rock the check and slip printing hammer lever 125 clockwise about its pivot away from the type carriers 41, to hold a stud 134 on the short arm of the hammer lever 125 in contact with a shoulder on the operating lever 128. A strong spring 136 holds the detail hammer operating lever 127 in contact with a stud 135 in the frame 88. A retracting spring 137 attached to a projection on the hammer lever 123 rocks the lever counter-clockwise away from its type carriers 40 to hold a stud 142 thereon in contact with a shoulder on its operating lever 127.

The longer arms of the two operating levers 127 and 128 extend towards each other, one of which arms has a beak 144 adapted to extend over a stud 143 on the adjacent arm of the remaining operating lever, to enable the single hammer-control cam 132 to actuate both operating levers.

The control cam 132 is provided with an effective cocking area terminating in a drop 145, succeeded by a recocking area 148 which in turn, terminates in a second drop 149, after which the first-named cocking area later becomes effective.

The parts are shown in their normal positions, in Fig. 7, wherein the nose 131 of the operating lever 128 contacts the low face of the cam 132 after having dropped off the high point, and the operating levers 127, 128 with their printing hammer levers 123, 125 are in their operated or relaxed positions, the beak 144 of the operating lever 127 lying in contact with the stud 143 on the operating lever 128.

The drive shaft 103 makes one rotation in counter-clockwise direction at each operation of the machine and the cam 132 on drive shaft 103, as it rotates, rocks the hammer-operating lever 128 clockwise about the stud 126 against the tension of restoring spring 129. The connecting spring 133 holds the hammer lever 125 in contact with the operating lever to cock or retract the check and slip printing hammer 75, and at the same time, the stud 143 on the operating lever 128 engages the beak 144 on the co-acting operating lever 127, and rocks this lever counter-clockwise about the stud 124 against the tension of the restoring spring 136, to thereby free the hammer lever 123 to the action of its retracting spring 137, which thereupon rocks the hammer 123 counter-clockwise to cock the hammer 60.

As the cam 132 continues to rotate, the high point thereof passes from under the nose 131 on the lever 128, whereupon the spring 129 rocks the lever 128 sharply in counter-clockwise direction to throw the hammer 75 sharply against the type wheels 41 and take an impression therefrom on the check.

A cam 146 is secured beside the cam 132 to turn therewith, the angular area of the lobe of the cam 146 being greater than the angular distance between the spaced drops 145 and 149 of the control cam 132, and so arranged relatively to the drops 145 and 149 that the leading end of the lobe of the cam 146 lies in advance of the drop 145, and the rear end of the lobe lies substantially in alinement with the drop 149.

A projection 147 on the operating lever 127 lies in proximity to the cam 146 to co-act with the periphery thereof, so that just prior to the time when the nose 131 of the operating lever 128 drops off the high point at the drop 145, the lobe of the cam 146 rides underneath the projection 147 of the operating lever 127, which, prior to this time, is held away from the cam 146 by the stud 143 on operating lever 128.

The lobe of the cam 146 remains in the path of the projection 147 of the operating lever 127 after the discharge of the printing hammer lever 125, so as to hold the operating lever 127 and its hammer lever 123 in cocked positions.

The cam 132, on its further rotation, brings the cocking area 148 beneath the nose 131 of the operating lever 128 to rock it clockwise a second time and effect a recocking of the hammer lever 125. Just before the nose 131 of the operating lever 128 drops off of the high point at the drop 149 of the cam 132, the lobe of the cam 146 passes from beneath the projection 147 of the lever 127 and, as the high point of the cam 132 escapes past the nose 131, the spring 129 again rocks the operating lever 128 and hammer lever 125 sharply counter-clockwise to deliver the second impression blow by the hammer 75 on the check, and the operating lever 127, being no longer held by the lobe of the cam 146, or by the stud 143, rocks sharply clockwise under the influence of its spring 136 to throw the printing hammer 60 into contact with the type wheels 40 to take an impression therefrom on the detail strip.

The restraint of the operating lever 127 by the cam 146 results in only one impression being made on the detail strip at one operation of the machine, whereas two impressions are made on the check, and, likewise, as will be described later, on the inserted slip.

As the machine approaches the extreme end of its operation, during which the second imprint occurs on the check or slip, the cam 96 (Fig. 2) rocks the lever 109 counter-clockwise and with it the shearing blade 107 (Fig. 1) to sever the check from the strip.

*Check ejector.*—After the second impression has been made on the check, and the check severed from the strip, it is desired to eject the check from the machine. To accomplish this, a pair of alined ejecting rolls 150 (Figs. 1, 3, 8 and 14) fast on a shaft 152 located just above the type carriers 41 on one side of the delivery chute, oppose a pair of alined tension rolls 151 supported on a spindle 140 carried by the lower arms of levers 202 pivoted on a shaft 203 on the opposite side of the delivery chute, the walls of which chute are apertured to enable the rolls 150, 151 to contact. The tension rolls 151 are normally held in retracted position, but at the proper time, swing into contact with the ejecting rolls 150 to grip the severed check. The ejecting rolls are then rotated rapidly in counter-clockwise direction to propel the check upwardly and out of the check and slip chute. The peripheries of both the ejector rolls 150 and the tension rolls 151 are knurled to prevent slippage between the rolls and the check.

In order to keep the delivery chute unobstructed to enable the feed cylinder 66 to advance the check between the ejecting and tension rolls 150, 151, it is desirable to provide means to retain the tension rolls 151 in retracted positions until the check has been advanced to a position where it can be gripped between the ejecting and tension rolls. Thereupon, it is convenient to arrange that the tension rolls 151 shall swing towards the ejecting rolls 150 to grip the check therebetween, after which the ejecting rolls are rotated to effect ejection of the check.

Incidentally, means is provided to disable the driving means for the ejecting rolls 150 until the check is gripped between the ejecting and tension rolls.

After the ejection of the check, a suitable means returns the tension rolls 151 to their normal retracted positions, and the drive for the ejecting rolls is disabled preparatory to the advance of the succeeding check to position between the ejecting and tension rolls.

Springs 201 (Figs. 1 and 3) tend to swing the spaced tension roll-supporting levers 202 and the tension rolls 151 rotatably mounted on the spindle 140 carried thereby, in clockwise direction into contact with the ejector rolls 150, but are normally prevented from so doing by the following mechanism.

Drive gear 89 (Fig. 7) meshes with an intermediate gear 173 journaled on a stud projecting from the side frame 88, which intermediate gear, in turn, meshes with a gear 172 journaled on a second stud 171 projecting from the side frame 88. Drive gear 89 turns the gear 172 in counter-clockwise direction throughout a single complete rotation.

A tension roll control cam 223 (Fig. 5) turns with the gear 172 in counter-clockwise direction.

Normally, a stud or roller 221 on one end of a control lever 212 pivoted on a stud 214 on the side frame 88, contacts the low point of the tension roll control cam, the opposite end of the control lever 212 having a slot and pin connection 211 forming a toggle joint with one end of a restraining lever 206 pivoted intermediate its ends on a stud 207 projecting from the side frame 88. A spring 220 attached to the control lever 212 and superior to the tension roll springs 201, tends to draw the control lever in clockwise direction and rock the restraining lever 206 counter-clockwise to press a stud 204 carried by a lateral extension 205 of the restraining lever 206, against an arm 208 (Figs. 2 and 3) fast on the shaft 203 on which the tension roll supporting levers 202 are pivoted, and thereby hold the arm 208 at its upper limit of travel. Fingers 209 also fast on the shaft 203 adjacent the respective tension roll supporting levers 202 contact pins 210 on the respective supporting levers to normally hold the levers at the limit of their counter-clockwise travel against the tension of the springs 201, with the tension rolls 151 withdrawn from contact with the ejecting rolls 150 and out of the path of the advancing check.

The control cam 223 (Fig. 5) although turning with the gear 172 does not at once operate the control lever 212, in order to afford time for the check strip 55 to be advanced to position between the ejecting and tension rolls 150, 151, after which the cam 223 rocks control lever 212 counter-clockwise which, through the pin and slot connection 211, rocks the restraining lever 206 clockwise to withdraw the stud 204 of the lateral extension 205 from the arm 208, and deprive the restraining fingers 209 of their resistance to the action of the tension springs 201.

Under the above conditions, the tension springs 201 would be, and in printing upon inserted slips or work sheets, as hereinafter explained, are free to rock the supporting levers 202 with their tension rolls 151 clockwise to cause the tension rolls to grip the advanced check between themselves and the ejector rolls 150.

It will be remembered that the check receives two successive imprints prior to its ejection, and as it is an object of this invention to utilize the ejector and tension rolls 150, 151 as feed rolls when operating on inserted slips, hence the tension roll control cam 223 is arranged to operate the above described linkage to release the tension rolls 151 for operation prior to the completion of the second advance of the check, and prior to the second impression thereon. Consequently, if the tension rolls 151 are permitted to establish contact with the ejector rolls 150 when feeding checks at this time, it would interfere with the feeding of the checks between the cylinder 66 and the rolls 150 and 151.

Therefore, means operable when printing and issuing checks, is provided to maintain the tension rolls 151 out of contact with the ejector rolls while the check is being advanced to the second printing position.

It will be remembered that the cam 96 (Fig. 2) rocks the lever 109 at the beginning of an operation, to swing the knife-supporting arm 72 (Fig. 1) clockwise to position the free end of the check strip in line with the opening in the stationary blade 74, as well as to shift the shearing blade 107 away from the stationary blade. A link 224 (Fig. 2) connects the rear arm of the lever 109 with the rearwardly extending arm of a detent lever 227 pivoted on a stud 228 in the rear of the side frame 50. The forwardly extending arm of the detent lever 227 normally lies in the path of, but apart from, a stud 230 on the restraining arm 208. Clockwise movement of the lever 109, at the beginning of the operation of the machine, before the cam 223 (Fig. 5) becomes effective, will operate through link 224 to rock the detent lever 227 clockwise (Fig. 2) and bring its forward end into contact with the stud 230 to prevent clockwise movement of the restraining arm 208, the shaft 203 and the tension rolls 151, even though the restraining stud 204 is withdrawn from the arm 208 by the restraining lever 206, lever 212 and cam 223.

Therefore, the tension rolls 151 are held in their retracted positions until the cam 96 (Figs. 2 and 4) rocks the lever 109 counter-clockwise to sever the check, at which time the free end of the detent lever 227 is lowered to withdraw the lever from contact with the stud 230 thereby freeing the restraining fingers 209 and the supporting levers 202 to the action of the spring 201. The spring 201 swings the supporting levers and their tension rolls 151 to cause the latter to grip the check, the latter by this time having been fed between the ejecting and tension rolls 150 and 151 by the check cylinder 66. The tension rolls 151 become effective just before the ejector rolls 150 are rotated to discharge the check, as now to be described.

Figure 15:
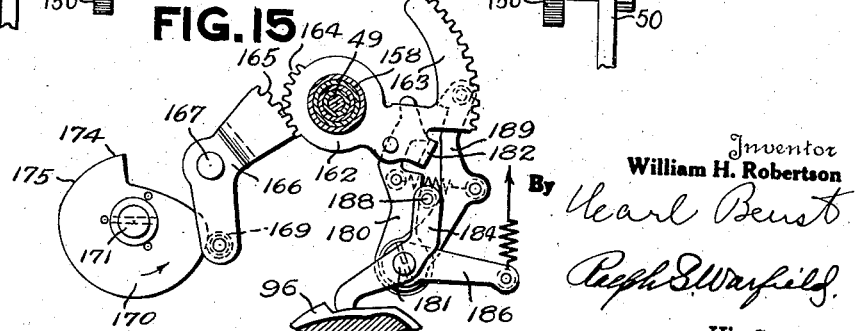
Fig. 15 is a detail side view of mechanism to control the ejection of a check, or the feed of an inserted slip, and is shown in operated position during an operation in which the mechanism is controlled to feed an inserted slip.

*Check ejecting mechanism.*—The driving gear 89 (Fig. 7) on the rod 90, through gear 173, imparts one complete counter-clockwise rotation to the gear 172, at each operation of the machine, as heretofore explained in connection with the control cam 223 (Fig. 5) for the tension rolls. A cam disk 170 (Figs. 2 and 15) journaled on the stud 171 and fast with the gear 172, coacts with a stud 169 carried on one arm 168 of a lever 166 pivoted on a stud 167 projecting from the frame 88, to rock the lever 166 in counter-clockwise direction. Segmentally arranged teeth 165 on the opposite arm of the lever 166 mesh with teeth 164 formed on a disk 162 carrying an ejecting segment 163 for the ejector rolls, such disk being journaled on a hub 158 mounted in a bracket 159 (Fig. 7) fixed to the side frame, the hub 158 surrounding a nest of type setting tubes encircling the stud 49 and having no other relation to the present invention.

The ejecting segment 163 drives a gear 161 (Fig. 7) secured to the side of a gear 154 journaled on a stud 160 projecting from the side frame 50, which gear 154 meshes with a gear 153 (Figs. 2 and 7) fast on that end of the ejector roll supporting shaft 152 (Figs. 1, 2 and 7) which projects through the printer side frame 50.

As the ejector cam 170 rotates at the beginning of the operation of the machine, it rocks the lever 166 counter-clockwise, which, through the teeth 165 thereon meshing with the teeth 164 on the check ejector segment disk 163, rocks the segment 163 clockwise. The ejector segment, on its clockwise travel, rotates the gears 154 and 161 in a counter-clockwise direction and the gear 153 in clockwise direction. The gear 153 being fast on the ejector roll shaft 152, rotates the ejector rolls 150 likewise in clockwise direction, but, since at this time, the tension rolls 151 are held retracted as heretofore explained, and do not grip the check, the clockwise rotation of the ejector rolls 150 in opposition to the direction in which the check is advancing is ineffective to displace the check. Such idle initial rotation of the ejecting rolls in clockwise direction is preliminary to their effective rotation in counter-clockwise direction to eject the check, and serves to cock the drive mechanism for the ejecting rolls, as now explained.

A driving arm 194 pivoted at one end on a stud 193 in the frame 88 has a slot and pin connection 195 with the ejector segment 163. A hub 196 connects the driving arm 194 with a second arm 192 to which is secured one end of a drive spring 191. The check ejector segment 163 on its initial or clockwise travel rocks the drive arms 194, 192 counter-clockwise to tension the drive spring 191.

The second printing impression is not made on the check until near the end of the operation of the machine, for which reason it is desirable to prevent the effective return rotation of the ejector rolls 150 until the very end of the operation. To effect such delay, a latch 180 snaps over an ear 182 of the segment 163 when the segment is fully retracted. The latch is held in its retracted position by a control lever 184. A nose on one arm of a check ejector control lever 184 (Figs. 2 and 4) fast on a suitably journaled shaft 181 normally rests in a recess 79 formed in the periphery of the knife-operating cam 96. A spring 185 attached to the end of an arm 186 fast on the shaft 181 holds the nose on the arm of the lever 184 always in contact with the periphery of the cam 96. An upwardly extending arm of the ejector control lever 184 carries a stud 188 which projects between a check ejector control latch 180 and a slip feed control latch 189 hereinafter referred to, both of which latches are pivoted on the shaft 181. A spring 190 connects the latches to normally hold them in contact with the stud 188.

The configuration of the inclined recess 79 in the periphery of the cam 96, within which the nose of the lever 184 normally rests, is such that immediately upon commencement of an operation of the machine, the cam will rock the check ejecting control lever 184 clockwise. The lever, upon its clockwise movement, through the stud 188 on the upwardly extending arm of the lever, rocks the slip feed control latch 189 clockwise to ineffective position, and the spring 190 draws the check ejector control latch 180 in clockwise direction from its normal ineffective position into the arcuate path of the ear 182 on the check ejector segment 163. As the ejector segment 163 rocks on its initial stroke in clockwise direction, the ear 182 wipes by the advanced check ejector control latch 180 and assumes a position just beneath the latch, which thereupon holds the ejector segment in cocked position. Hence, when the mutilated periphery of the cam 170 (Fig. 7) arrives opposite the stud 169 on the ejector lever 166, the latch 180 prevents counter-clockwise movement of the check ejector segment 163 under the influence of its drive spring 191 until the recess 79 in the periphery of the cam 96 registers with the nose of the lever 184. At this time, the spring 185 rocks the shaft 181 and with it the lever 184, counter-clockwise to press the stud 188 on the lever 184 against the check ejector control latch 180 and rock it counter-clockwise to release the check ejector segment 163, whereupon the strong spring 191 (Fig. 7) rocks the arms 192 and 194 clockwise to rock the ejector segment 163 sharply counter-clockwise. Slightly before the release of the check ejecting segment 163 for operation, the cam 96, through lever 109 (Fig. 2) rocks the shaft 73 counter-clockwise and with it the knife-supporting arm 72 and shearing blade 107 to sever the check from the strip 55.

Coincidentally with the severing of the check from the strip the lever 109 through link rocks the restraining lever 227 to cause the latter to release its restraint of the stud 204, thereby freeing the tension rolls 151 (Fig. 3) to the action of their springs 201 which snap the rolls towards the ejecting rolls 150 to grip the severed check between the two sets of rolls. The tension rolls 151 having gripped the advanced check between themselves and the ejector rolls 150, and the second printing impression having occurred, the ejector segment 163, by means of the gears 161, 154 and 153, and the shaft 152, rotates the ejector rolls 150 rapidly counter-clockwise to eject the check from the machine.

As it is not desirable that a check be projected entirely from the machine, a check stop 200 (Fig. 1) is provided. This stop is in the form of a spring finger having a hemispherical end lightly contacting the rear chute plate 118. The force of the expulsion of the check is sufficient to drive it between the spring stop finger 200 and the plate 118 far enough so that the end of the check protrudes above the cabinet of the machine so as to be grasped by the operator or by the customer, who removes it manually from the machine.

The configuration of the cam 223 (Fig. 5) is such that it would permit the leverage 212, 206 and the stud 204 (Figs. 2, 3 and 5) to retract the tension rolls 151 under the influence of the strong spring 220 before the release of the ejector segment 163 by the latch 180. Therefore, to prevent the restoring spring 220 from returning the stud 204 to its effective position until after the ejecting action is completed, the lever 212 is temporarily locked against its operation by the tensioned spring 220, as follows.

The free end of a detent 232 (Figs. 2 and 4) pivoted on a stud 233 projecting from the side frame 50, is formed eccentrically with its pivot 223, and extends to a point a short distance in advance of the home position of the ejecting segment 163 to wedge against the ear 182 of the ejecting segment thus operating to hold the latter normally idle against the tension of its spring 231 which tends to rock the detent in clockwise direction.

The upper arm of the operating lever 212 carries a lug 234 normally lying out of line with a shoulder 240 formed in the lower edge of the detent 232.

At the very beginning of the operation of the machine, the cam 170 retracts the segment 163, thus withdrawing the ear 182 from the eccentric end of the detent 232, whereupon the spring 231 rocks the detent 232, so that it rests on the lug 234 of the tension lever 212.

Upon continued operation of the machine, when the tension roll-controlling cam 223 (Fig. 5) rocks the leverage 212, 206 to withdraw the stud 204 and free the tension rolls 151 to the action of their springs 201, the lever 212 is rocked counter-clockwise to position its lug 234 in front of the shoulder 240 on the detent 232, whereupon the spring 231 snaps the detent 232 clockwise, thus locking the leverage 212, 206 in operated position with the stud 204 in idle position, against the tension of the strong restoring spring 220.

The detent 232 maintains the tension roll release mechanism in idle position until the ejector segment 163 is restored under the influence of its strong spring 191, as heretofore explained, near the end of the operation of the machine.

The ear 182 of the ejector segment 163, upon the return of the latter to its home position, strikes the free end of the detent 232 which lies at an angle to the path of travel of the lip, and restores the detent to its idle position, thereby releasing the leverage 212, 206 to the action of its strong spring 220, which immediately rocks the levers to press the tension releasing stud 204 (Fig. 3) upwardly against the arm 208, thereby rocking the fingers 209 against the pins 210 on the tension roll-supporting levers 202 to rock the supporting levers counter-clockwise and withdraw the tension rolls 151 from the check and slip chute.

The low point of the control cam 223 (Fig. 5) lies in the path of the stud 221 on the lower end of the lever 212 to arrest the levers 212, 206 in their normal positions.

Normally, the spring 185 (Fig. 4) through the trip lever 184 and trip stud 188, holds the latch 180 out of the path of the ear 182 on the ejecting segment 163, due to the fact that the nose of the trip lever 184 normally lies in the deepest part of the inclined notch 79 in the cam 96. As a result, the connecting spring 190 between the drive segment latch 180 and the slip feed control latch 189, normally holds the latter in the path of the ear 182 on the drive segment, and restores the latch 189 to such position when the trip stud 188 displaces the latch 180 to release the cocked ejector segment 163 for effective operation, as heretofore explained.

At the time of the release of the ejector segment 163 for counter-clockwise travel to rotate the ejector rolls 150 to eject the check, it is essential that the slip feed control latch 189 (Fig. 4) be out of the path of the ear 182 on the ejector segment. It will be remembered that the peripheral configuration of the cam 96 is such that, at the beginning of its rotation, it rocks the trip lever 184 clockwise, which, through the trip stud 188 on the lever rocks the slip feed control latch 189 clockwise to idle position. A lateral stud 241 on the upper end of the slip feed latch 189 projects through a slot 242 in a link 243 pivoted to an ear on the detent 232. The clockwise movement of the slip feed control latch 189 swings the lower end of the link 243 sufficiently to position a hook 244 on the link above a stud 245 in the frame 88. This movement of the link 243 is completed before the lug 234 on the lever 212 passes in front of the shoulder 240 on the detent 232.

Figure 4:
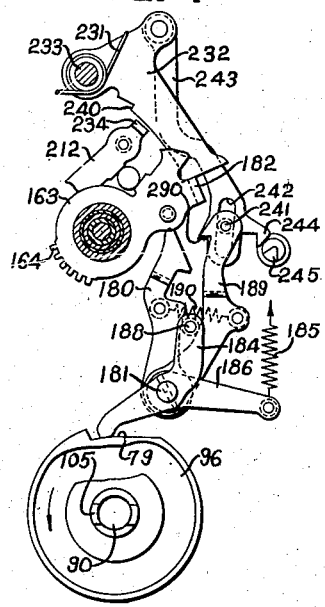
Fig. 4 is a detail side view of mechanism to control the ejection of a check or the feed of an inserted slip.

When the spring 231 rocks the detent 232 clockwise to enter the shoulder 240 therein into the return path of the lug 234, it lowers the link 243 to engage the hook 244 with the stud 245, thereby preventing clockwise movement of said link and counter-clockwise movement of the slip control latch 189 until the ear 182 of the ejector segment 163 on the return of the segment to its home position, rocks the detent 232 counter-clockwise, whereupon the link 243 is raised, and as the hook 244 clears the stud 245, the spring 190 rocks the slip feed control latch 189 and the link 243 to their normal positions, as shown in Fig. 4.

*Slip printing.*—The slip (Fig. 6) to be printed upon, is inserted head downwardly into the chute formed between the front and rear plates 117 and 118, until it is arrested by an adjustable stop 246 (Figs. 1, 10 and 11) clamped on the rear plate 118 by a knurled thumb nut 247. As the slip is placed in the first printing position manually, and as no check is to be issued when printing on an inserted slip, it is not desirable to rotate the check feed cylinder 66 and the knife-operating cam 96 (Figs. 1, 2, 4 and 13) during a slip printing operation. For this reason, means is provided, as will now be described, to disable the driving means for these elements during operations on which a slip is inserted in the machine in position to receive an impression from type wheels 41.

This disabling device is controlled by a slip feeler 250 (Figs. 1 and 8) pivotally connected at its rear end to an arm 251 fast on a shaft 252 journaled in the printer front frame (not shown) and in the printer frame 50. The feeler 250 is guided against vertical displacement between the shaft 203, upon which the tension roll-supporting levers 202 are pivoted, and the spindle 140 carried by the levers 202 on which spindle the tension rolls are mounted, and against lateral displacement by a pair of check plates 249 (Fig. 14) fast on the shaft 203. The forward end of the feeler 250 lies in line with an aperture formed in the rear plate 118 of the chute. A forked arm 253 (Figs. 8 and 9) fast on the inner end of the shaft 252 embraces a stud 254 carried by an arm 255 fast on the end of a short shaft 256 journaled in the frame 88 in axial alinement with the feeler shaft 252. A link 257 (Fig. 8) pivoted at one end to a bent arm 258 fast on the inner end of the short shaft 256 is provided with an enlarged head at its opposite end, which head is slotted to accommodate and be supported on a stud 259 projecting from the frame 88.

A spring 264 normally holds a hooked arm 262 pivoted at 263, with its hook embracing a stud 261 projecting from the enlarged head of the link 257 to retain the link in its forward position against the tension of an inferior spring 275, and through the arm 258, shaft 256, arm 255, stud 254, forked arm 253, shaft 252 and arm 251, retain the feeler 250 withdrawn from the chute.

The spring 264 also presses the hooked arm 262 against a pin 274 on a slotted plate 272 slidably supported on guide studs 273 projecting from the side frame 88.

The usual motor release bar 270 is removably supported on pins 271 projecting from the slotted plate 272 to release the machine and the feeler 250, as hereinafter explained.

A stud 276 on the free end of the bent arm 258 traverses a cam slot 277 formed in one arm 278 of a crank, comprising the arm 278, shaft 279 and arm 281. The shaft 279 is journaled in the side frame 88. A clutch release stud 280 on the arm 281 of the crank is shiftable into and out of the path of the tail 282 of the clutch drive pawl 93 pivoted on the mutilated disk 92 (see also Fig. 13) through which power is transmitted to the cam 96 controlling the operation of the shearing blade 107 of the knife, as well as the means (Fig. 2) for restraining the operation of the tension rolls 151, the trip lever 184, and the feed cylinder 66, all as heretofore explained. Normally, the stud 280 lies in the path of the tail 282 of the clutch pawl 93.

Obviously, by disabling the clutch pawl 93, the check feed cylinder 66, the knife blade 107, the trip lever 184 (which normally displaces the slip feed control latch 189) and the tension roll restraining linkage 109, 224, 227 will all remain idle.

The motor bar 270 (Fig. 8) when depressed, forces the supporting plate 272 inwardly with its pin 274 pressing against the hooked restoring arm 262 to rock the latter clockwise against the tension of the superior spring 264, thereby relieving the feeler link 257 of the restraining action of the restoring spring 264 and freeing it to the action of the inferior spring 275, which, thereupon, draws the feeler link 257 to the right (Fig. 8) and through the linkage heretofore explained, projects the feeler 250 across the chute formed between the chute plates 117, 118.

This action of the feeler 250 occurs at the very beginning of every operation of the machine, that is, upon depression of the motor bar 270, to enable the feeler to perform its function before the other mechanisms have time to operate.

Assuming that no slip has been inserted into the chute, the spring 275 will project the feeler 250 entirely across the chute and through the opposite opening 119 therein. This extended travel of the feeler 250 enables the free end of the bent arm 258 to rock counter-clockwise and cause its stud 276 to travel from its normal position intermediate the ends of the cam slot 277, to the extreme right-hand end (Fig. 8) of the slot to rock the crank 278, 279, 281 and lift the clutch disabling stud 280 out of the path of the tail 282 of the clutch drive pawl 93, to prevent interference with the latter. Hence power is transmitted to the cam 96 which effects the operation of the check feed cylinder 66, the knife blade 107, the tension roll restraining linkage 109, 224, 227 and the trip lever 184, as heretofore explained.

If, however, a slip has been inserted in the chute, the feeler 250 on its advance across the chute, is arrested by the slip and prevented from entering the opening 119. The travel of the feeler is thus limited to such an extent as to prevent the cam stud 276 on the bent arm 258 from entering the effective portion of cam slot 277 in the crank arm 278. As a result, the crank arm 281 is held unyieldingly in normal position with the clutch disabling stud 280 in the path of the tail 282 of the clutch drive pawl 93, so that as the latter starts to rotate counter-clockwise, it is rocked out of engagement from the lug 95 on the cam 96 (see Fig. 13) and imparts no motion to the cam. In consequence, the check feed cylinder 66, the knife blade 107, the tension roll restraining linkage, and the trip lever 184 all remain idle.

By disabling the knife blade 107, the chute door 112 (Fig. 1) remains in its normal position, so as not to pinch the inserted slip and prevent the advance thereof to its second printing position, as hereinafter explained.

The hooked restoring arm 262 is latched in its depressed position by mechanism not shown herein but fully disclosed in the prior Robertson applications heretofore referred to, until near the end of the operation of the machine.

Consequently, the restoring spring 264 cannot operate to withdraw the feeler 250 from the chute, prior to the advance of the leading end of the check strip 55, in operations wherein a check is printed and issued, nor can it operate to withdraw the feeler prior to the feed of the slip to take its second impression.

Therefore, means operable independently of the restoring arm 262 is provided to withdraw the feeler to its idle position out of the way of the advancing check strip or slip, shortly after the machine starts its operation.

As stated above, shortly after the beginning of an operation, the cam 223 (Fig. 5) rocks the levers 212 and 206 to withdraw the restraining stud 204 (Fig. 3) and permit the springs 201 to rock the tension rolls 151 into contact with the ejecting rolls 150. A link 283 pivotally connected at one end to the lever 206, is bifurcated at its opposite end to embrace the stud 254 (Fig. 8) on the arm 255 fast on the short shaft 256. Upon the clockwise movement of the lever 206, (Fig. 5) the link 283, through the stud 254, rocks the feeler arms 253 and 251 (Fig. 9) clockwise to withdraw the slip feeler 250 from contact with the slip or from the path of the check strip, and at the same time, the stud 254 rocks the arm 255, shaft 256 and bent arm 258 clockwise to restore the feeler link 257 to the left (Fig. 8) where a shoulder 248 in the slot surrounding the stud 259 drops over the stud to hold the parts in normal positions until the end of the operation.

It is desirable to latch the feeler link 257 in its restored position by dropping the shoulder 248 in front of the stud 259 to prevent the spring 275 from again projecting or attempting to project the feeler 250 across the chute prematurely.

Normally, the free end of the hooked restoring arm 262 supports the free end of the link, a stud 260 resting on the free end of the arm 262, so that the shoulder 248 of the link 257 is disengaged from the stud 259, but at the time of restoration of the link to its normal position, the hooked restraining arm is still held in its depressed or operated position by the mechanism shown in the Robertson applications, Serial Nos. 106,454; 169,583 and 172,660, heretofore referred to.

The latching of the link 257 on the stud 259 is precautionary to insure the proper operation of the machine in case of failure of the operator to remove his hand from the release key.

At the end of the operation, mechanism not shown herein releases the depressed motor release bar 270, whereupon the spring 264 rocks the hooked restoring arm 262 counter-clockwise to return the motor release key to its normal position. As the restoring arm 262 rocks counter-clockwise, it contacts the stud 261 to hold the link 257 in its normal position, and the end of the arm strikes the stud 260 on the link 257 and raises the link to disengage the shoulder 248 from the stud 259 in which positions the parts are ready for another operation.

As the arm 258 rocks clockwise to its normal position, as shown in Fig. 8, the stud 276 rocks the crank arm 278, shaft 279 and crank arm 281 counter-clockwise to position the stud 280 in the path of the tail 282 of the clutch drive pawl 93.

It will be remembered that on operations during which a check is issued, the tension rollers 151 are restrained until quite near the end of the operation, the check being fed between impressions by the check feed cylinder 66. On slip printing operations, however, the check feed cylinder is disabled, as above described, but it is desired to feed the slip between the first and second impressions. To accomplish this, the check ejector rolls 150 and the tension roll mechanism are controlled by the slip feeler in a manner now to be described.

As above described, the slip feeler 250 (Fig. 8) is not permitted to move forward its maximum distance when the slip is inserted in the machine, and therefore, the stud 280 remains in position in the path of the tail 282 of the driving pawl 93, to disable the knife-operating cam 96 and the several mechanisms actuated therefrom. As a result, the time of operation of the tension rolls 151 and of the check ejecting rolls 150 is changed.

Referring first to the tension roll controlling mechanism, it will be remembered that the tension rolls 151 normally occupy their idle positions withdrawn from the ejecting rolls 150 and from the chute.

Shortly after the beginning of a slip printing operation of the machine, the tension roll cam 223 (Fig. 5) rocks the levers 212, 206 to withdraw the restraining stud 204 from beneath the restraining arm 208 (Figs. 2 and 3) thereby relieving the restraining pressure furnished by the strong spring 220 (Fig. 5) to the restraining fingers 209 (Figs. 2 and 3) so that, other restraints being absent, the tension roll springs 201 can rock the tension roll supporting levers 202 to shift the tension rolls 151 against the ejecting rolls 150 to grip the slip therebetween.

In check-issuing operations, however, this action of the tension rolls is delayed by the restraining lever 227 (Fig. 2) under control of the cam 96.

But in slip-printing operations, the feeler 250 by contact with the inserted slip, controls the disconnection of the cam 96 from the drive mechanism to render the cam idle.

Figure 2:
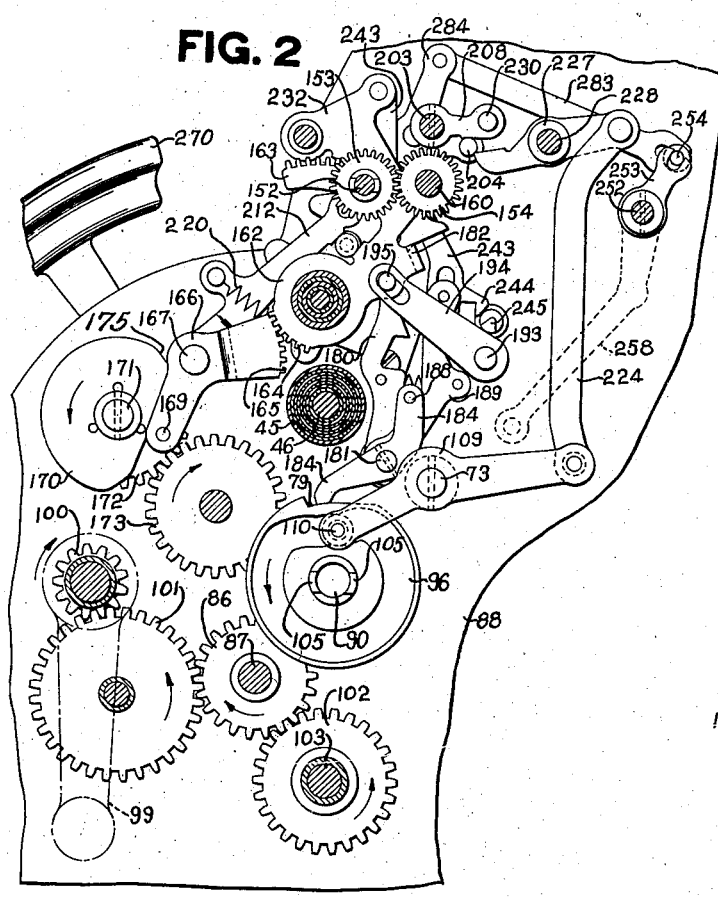
Fig. 2 is a detail side view of the drive for the check ejector mechanism and the slip feed tension device.
Figure 3:
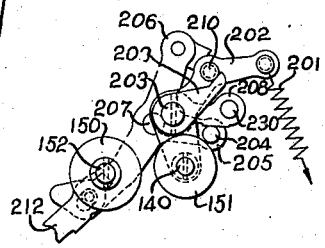
Fig. 3 is a fragmentary detail view, showing the tension rolls withdrawn from the feed or ejecting rolls in normal position.

Consequently, in slip-printing operations, the restraining lever 227 remains in its ineffective position withdrawn from the restraining arm 208, as shown in Fig. 2, and the tension rolls 151 shift to effective position as the cam 223 relieves the pressure of the restraining fingers 209.

Simultaneously, the link 283 (Figs. 2, 4 and 5) operates to withdraw the feeler 250, as heretofore explained.

Coincidentally, the lug 234 on the upper end of the operating or tension lever 212 for the tension rolls, rocks with the lever, from its normal position shown in Fig. 4 to a position in front of the shoulder 240 on the detent 232.

The tension rolls 151 in slip-printing operations become effective just prior to the first impression on the slip.

Referring now to the check ejecting mechanism, it will be remembered that early in a check printing and issuing operation, the cam 96 rocks the trip lever 184 (Figs. 2 and 4) clockwise to move the slip feed control latch 189 out of the path of the ear 182 on the check ejector segment 163 and at the same time, moves the check ejector control latch 180 into the path of said ear to lock the ejector segment in its fully retracted position. Since, however, the cam 96 is automatically disabled in a slip printing operation, it is obvious that the control latches 180 and 189 will remain in their normal positions, with the slip control latch 189 in the path of the ear 182. Therefore, when the ejector cam 170 (Figs. 2 and 7) rocks the ejector segment 163 clockwise to retract the latter, as explained above, the ear 182 (Figs. 2 and 4) wipes past the latch 189 and completes its clockwise travel to retracted position below the head of the latch, where it is held temporarily by a dwell 174 on the periphery of the ejector cam 170. As soon as the ear 182 passes the hook portion of the control latch 189, the spring 190 immediately restores the latch back into the path of return of the ear 182. As such retraction of the ejector segment 163 commences, the withdrawal of the ear 182 relieves the end of the detent 232 of the pressure of the spring 191 (Figs. 4 and 7), whereupon the spring 231 rocks the detent clockwise so that it rests on the lug 234 of the tension lever 212.

When the tension lever 212 is rocked by its cam 223 to release the tension rolls 151 for operation and to tension the spring 220 for withdrawing the tension rolls 151 later, the lug 234 shifts in front of the shoulder 240 of the detent 232, whereupon the spring 231 rocks the detent 232 further in clockwise direction to snap the shoulder 240 in front of the lug 234 and lock the tension lever 212 in its cocked position. In so doing, the detent lowers the link 243 so that the hook 244 thereon rests in front of the stud 245. This movement of the link 243 lowers a shoulder 290 thereon into the path of return of the ear 182 on the ejector segment 163.

Shortly after the first impression has been made on the slip, a slight drop 175 (Figs. 2, 7 and 15) of the ejector cam 170 (Figs. 2 and 7) permits the spring 191 to rock the ejector segment 163 counterclockwise through a part of its return travel to rotate the check ejector rolls 150 sufficiently to feed the slip to position to receive the second impression.

After such feed of the slip, the dwell 174 on the peripheral contour of the ejector cam 170, which dwell lies between the slight drop 175 and the drop to the low point of the cam, arrests the stud 169, lever 166 and ejector segment 163 before the segment, on its return travel under the influence of the spring 191, reaches its normal position, such arrest occurring before the ear 182 on the ejector segment reaches the shoulder 290 (Fig. 4) on the link 243. Hence the tension rolls 151 remain in effective positions against the ejector rolls 150 to hold the inserted slip in its advanced position to take the second imprint, but immediately after the second impression occurs, the ejector cam 170 which has continued to rotate, brings the low point of the cam opposite the stud 169 of the lever 166, thereby again freeing the ejector segment 163 to the action of its restoring spring 191.

The shoulder 290 on the link 243 lies below the hook of the slip control latch 189, so that upon the farther advance of the ejecting segment 163, when the low point of the cam 170 returns to its normal position, the ear 182 strikes the shoulder 290 and raises the link 243, rocking the detent 232 slightly counterclockwise to release the lug 234 on the lever 212. The strong spring 220 then acts to restore this lever, and the lever 206, to their normal positions, which press the restraining stud 204 against the restraining arm 208 to rock the shaft 203 and force the restraining fingers 209 against the pins 210 on the tension roll supporting levers 202, thereby rocking the latter to withdraw the tension rolls 151 and releases the slip. This occurs near the end of the operation, after which the slip may be removed from the machine.

The ear 182 needs to lift the link 243 but a short distance in order to cause the detent 232 to release the lug 234 on the tension lever 212, after which the ear 182 is caught and held by the hook on the latch 189 before it can complete its return to home position. The latch 189 maintains the segment 163 in such partially restored position at the end of the slip printing operation, to prevent the forcible ejection of the slip.

Were it not for this, the slip control latch 189 and link 243 might be omitted.

The ejector segment 163 is held by the latch 189 at every slip printing operation to limit its path of travel, but this has no effect on the operation of cam 170 which will pick up the lever 166 at any position in which it may have stopped at the end of the last operation.

The normal position of the check chute gate 112 (Fig. 1), together with the curved lower end of the chute plate 117, facilitates the entry of the inserted end of the slip into the space between the chute plates 115, 118 and prevents the entry of the inserted end of the slip into the aperture in the stationary knife blade 74.

*Interlocks.*—As explained, the check is ejected from the machine at the very end of the operation, and it is obvious that the check tension rolls 151 should be effective until the check is completely ejected. It is for this reason that, not until the very end of its effective movement does the ejecting segment 163, through the ear 182, rock the detent 232 counter-clockwise to release the lug 234 of the lever 212, which, by the action of the restoring spring 220, rocks the lever 206 clockwise to withdraw the tension rolls 151. This tension roll release movement is not concluded with the operation of the machine, but continues or extends beyond the regular cycle of operation, for which reason it is desirable to provide means to prevent release of the machine to commence another operation, until all of the parts have resumed their respective normal positions.

Figure 5:
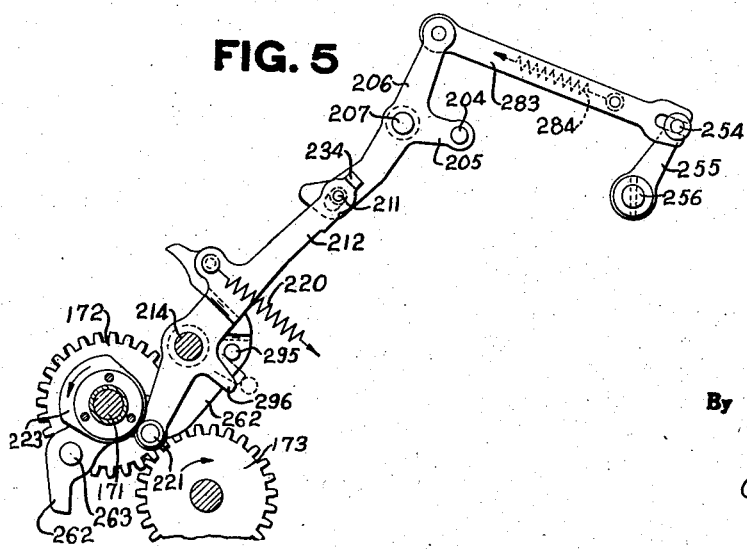
Fig. 5 is a detail view of the check and slip tension control mechanism and the slip feeler restoring mechanism.

One such means comprises a stud 295 (Figs. 5 and 8) on the hooked restoring arm 262 with which cooperates a projection 296 of the tension lever 212 (Fig. 5). The restoring arm 262, it will be remembered, is rocked clockwise upon depression of the motor release bar 270 to start the machine. This positions the stud 295 (Figs. 5 and 8) slightly beyond the path of the projection 296, as indicated in dotted lines in Fig. 5. When the tension cam 223 rocks the lever 212 counter-clockwise, the projection 296 on the lever assumes a position directly in the path of return of the stud 295, to prevent counter-clockwise movement of the restoring arm 262 until the projection 296 is withdrawn from the path of said stud. Such withdrawal occurs when the detent 232 (Fig. 4) is rocked counter-clockwise at the end of the operation to release the lug 234 on lever 212, thereby permitting the spring 220 to restore the lever to its normal position.

The customary non-repeat-pawl (not herein shown, but fully disclosed in Robertson's co-pending applications for U. S. Letters Patent, above mentioned) prevents a succeeding operation of the machine until the arm 262 is restored, and the arm 262 does not restore until the necessary spring-operated movements of the parts have been completed. Hence the projection 296 effectively prevents a succeeding operation of the machine until the operation of the spring-operated ejector segment and tension roll is completed.

It will be noted that no manual controls are necessary to determine whether a check printing and issuing, or a slip printing operation shall take place. The presence or absence of a slip or other record material in the proper printing position determines the operation of the device and controls the timing of the check ejector mechanism to eject at the very end of the operation, or to feed the slips between impressions. The timing of the effectivity of the tension rolls is controlled in the same manner and, as described, the presence of a slip in the path of a feeler automatically disables the check issuing mechanism.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new is:—

1. In a machine of the class described, the combination with a printing element; and means to take impressions from said printing element on a plurality of record materials; of means normally effective to eject one of said record materials; and means under the control of another of said record materials to adjust said ejecting means to feed last-named record material.

2. In a machine of the class described, the combination with a printing element; and means to take impressions from said printing element on one or another of a plurality of sorts of record material; of means normally effective to eject one sort of record material subsequently to the final impression thereon; and means controlled by another of the sorts of record material to adapt the ejecting means to advance the last-named sort of record material to space apart the impressions thereon.

3. In a machine of the class described, the combination with a printing element; and means to take impressions from the printing element on one or another of a plurality of sorts of record material; of means normally effective subsequently to the final impression on one sort of record material to eject such record material; and means controlled by another of the sorts of record material to vary the time of operation of the ejecting means and utilize it as a feed means to advance such last-named sort of record material prior to the final impression of the printing element thereon.

4. In a machine of the class described, the combination with a printing element; and means to take impressions therefrom on an issuing record material, or on an inserted record material; of means to eject the first-mentioned record material after the last impression is made thereon; and means controlled by the inserted record material to cause the ejecting means to feed said inserted record material prior to the last impression.

5. In a machine of the class described, the combination with a printing element; means to take impressions therefrom on an issuing record material, or on an inserted record material; means to feed the issuing record material; means to eject the issuing record material after it has been fed and subsequently to the last printing impression thereon; of means effectively controlled by the inserted record material only, to effect the operation of the ejecting means at a time prior to its normal time of operation to advance the inserted record material prior to the final impression thereon.

6. In a machine of the class described, the combination with a printing element; and means to take impressions therefrom on an issuing record material, or on an inserted record material; of means to eject the issuing record material after the last impression is made thereon; a feeler controlled by the inserted record material; and means under the control of the feeler to cause the ejecting means to feed said inserted record material before the last impression is made thereon.

7. In a machine of the class described; the combination with a printing element; means to take impressions therefrom on an issuing record material or on an inserted record material; means to feed the issuing record material to printing position; and means to eject the issuing record material after it has received its second impression; of means under control of the inserted record material to disable the feeding means for the issuing record material; and means also controlled by the inserted record material to cause the issuing record material ejecting means to feed the inserted record material before it receives the second impression.

8. In a machine of the class described; the combination with a printing element; means to take impressions therefrom on an issuing check or on an inserted slip; and means to eject the issuing check after a plurality of impressions have been made thereon; of normally ineffective detaining means to postpone the operation of the ejecting means; and means to render said detaining means effective to control the ejecting means to eject the check.

9. In a machine of the class described, the combination with a printing element; means to take impressions therefrom on an issuing check or on an inserted slip; and mechanism to eject the check or feed a slip; of means to cock the mechanism for an ejecting operation; a latch to detain the mechanism in cocked position; and means to trip the latch.

10. In a machine of the class described, operable upon different classes of record material; the combination with means to eject one class of record material at each operation of the machine when operating upon that class of record material; of means to control the ejecting means to cause it to act only to feed a different class of record material on those operations of the machine wherein the last-named class of record material is operated upon.

11. In a machine of the class described, operable upon different classes of record material; the combination with a printing element to which only a single class of record material is presented at any one operation of the machine; of means to eject one class of record material subsequently to its presentation to the printing element; of means to control the ejecting means to cause it to act to feed another class of record material relatively to the printing element.

12. In a machine of the class described, operable upon different classes of record material; the combination with a printing element to which only a single class of record material is presented at any one operation of the machine; and ejecting means having a maximum path of travel to eject one class of record material subsequently to its presentation to the printing element, on one operation of the machine; and means to limit the travel of the ejecting means on another operation of the machine to cause it to feed another class of record material.

13. In a machine of the class described, operable upon different classes of record material; the combination with a printing element to which only a single class of record material is presented at any one operation of the machine; of ejecting means having a maximum path of travel to eject one class of record material, on one operation of the machine; and a minimum path of travel to feed another class of record material on another operation of the machine; and means controlled by the latter class of record material to confine the ejecting means to its minimum path of travel.

14. In a machine of the class described, the combination with an ejecting means having a maximum travel to eject record material; of means automatically controlled by other record material to limit the travel of the ejecting means to cause it to feed said other record material only.

15. In a machine of the class described, the combination with an ejecting means operable at one stage of one operation of the machine to eject record material; of means to effect the operation of the ejecting means at another point in another operation of the machine, to cause it to feed record material.

16. In a machine of the class described, the combination with an ejecting means operable at one stage of one operation of the machine to eject record material; of means automatically controlled by record material to effect the operation of the ejecting means at another point in another operation of the machine, to enable the ejecting means to feed record material.

17. In a machine of the class described, the combination with an ejecting means operable at one stage of the operation of the machine to eject record material; of means to effect the operation of the ejecting means at another stage in another operation of the machine; and means to limit the travel of the ejecting means to cause it only to feed record material.

18. In a machine of the class described, the combination with an ejecting means operable at one stage of the operation of the machine to eject record material; of means automatically controlled by record material to effect the operation of the ejecting means at another stage in another operation of the machine, and to limit the travel of the ejecting means to a feeding operation.

19. In a machine of the class described, the combination with an ejecting mechanism; of means to postpone the operation of the ejecting mechanism until the latter part of the operation of the machine; of means to disable the postponing means, to enable the ejecting means to operate at an earlier stage in the operation of the machine; and means to limit the travel of the ejecting means to cause it only to feed record material.

20. In a machine of the class described, the combination with an ejecting mechanism; of means to postpone the operation of the ejecting mechanism until the latter part of the operation of the machine; of means to disable the postponing means, to enable the ejecting means to operate at an earlier stage in the operation of the machine.

21. In a machine of the class described, the combination with a printing element; means to take impressions therefrom on a plurality of classes of record material, respectively; and ejecting means for one of such classes of record material; of means to control the ejecting means to enable the latter to eject such class of record material on one operation; means to control the ejecting means to cause it to feed another class of record material on another operation; and means controlled by the latter class of record material to limit the operation of the ejecting means to a feeding operation only.

22. In a machine of the class described; the combination with a printing element; means to take impressions therefrom on an issuing check or on an inserted slip, and means to eject the check; of means to control the ejecting means to eject the check; another means to control the ejecting means to cause it to feed a slip; and automatic means to determine which of said last-named means is to be effective to control the ejecting means.

23. In a machine of the class described; the combination with a printing element; means to take impressions therefrom on an issuing check or on an inserted slip; of a means adapted to eject the check or feed the inserted slip; means to detain the ejecting means against effective operation; means to control the ejecting means in its feed of the inserted slip; and automatic means to determine which one of said two last-named means is to be effective to control the ejecting means.

24. In a machine of the class described; the combination with a printing element; means to take impressions therefrom on different classes of record material, respectively at different times; and ejecting means for one of such classes of record material; of means to control the ejecting means to eject such class of record material; means to control the ejecting means to feed another class of record material; and means controlled by the latter class of record material to render the ejecting means ineffective to operate as an ejecting means.

25. In a machine of the class described; the combination with a printing element; means to take impressions from said element on one or another of a plurality of different classes of record material, respectively; and ejecting means; of a latch mechanism to control the ejecting means to eject one class of record material, on one operation, or to feed another class of record material on another operation; and a feeler to control the latch mechanism to determine whether the ejecting means shall operate to eject or to feed.

26. In a machine of the class described; the combination with a printing element; means to take impressions therefrom on one or another of a plurality of different classes of record material, respectively; and ejecting means; of a latch mechanism adapted to control the ejecting means to eject one class of record material on one operation, or to feed another class of record material on another operation, such latch mechanism including a plurality of detaining members, one only of which operates at a time to control the ejecting means; and a feeler controllable by one class of record material to determine which of said detaining members is to be effective to control the ejecting means.

27. In a machine of the class described, the combination with a printing element; means to take impressions therefrom on one or another of a plurality of different classes of record material, respectively; and ejecting means; of a latch mechanism adapted to control the ejecting means to eject one class of record material on one operation, or to feed another class of record material on another operation, such latch mechanism including detaining members, one of which is normally effective and another ineffective relatively to the ejecting means; means to reverse the effectiveness of the said detaining members; and a feeler to disable the last-named means.

28. In a machine of the class described; the combination with a printing element; and means to take impressions therefrom on different classes of record material; of means to eject one class of record material, or to feed another class of record material including ejecting rolls; a spring-driven segment to operate the ejecting rolls; a plurality of latches to cooperate individually with the segment to determine whether it shall eject or feed; and means to select the latch which shall become effective.

29. In a machine of the class described; the combination with a printing element; and means to take impressions therefrom on record material of different classes; of means to eject one class of record material on one operation, or to feed another class of record material on another operation, including ejecting and tension rolls, and a segment to drive the ejecting rolls; means to rock the segment in one direction; a spring to restore the segment; a plurality of latches to control the restoring travel of the segment; and means under the control of one of the classes of record material to determine which one of said latches shall control the ejecting segment.

30. In a machine of the class described; the combination with a printing element; and means to take impressions therefrom on different classes of record material; of an ejector mechanism, including ejecting and tension rolls, and a drive segment therefor; a latch mechanism including a detaining member normally ineffective to control the ejector segment to eject one class of record material, and another detaining member normally effective to control the ejector segment to feed another class of record material; means to render the first-mentioned detaining member effective and to render the second-mentioned detaining member ineffective; and means, including a feeler, to automatically disable the last-named means.

31. In a machine of the class described; the combination with a printing element; and means to take impressions therefrom on different classes of record material; of ejecting mechanism, including a drive segment adapted to be retracted from and restored to normal position; a latch mechanism, including a normally ineffective detaining member to control the drive segment to eject one class of record material, and a normally effective detaining member to limit the restoring travel of the ejector segment to feed another class of record material; means to render the first-mentioned detaining member effective, and to render the second-mentioned detaining member ineffective; and means to disable the last-mentioned means.

32. In a machine of the class described; the combination with a printing element; and means to take impressions therefrom on different classes of record material; of an ejector mechanism, including an ejector segment; a latch mechanism, including a normally ineffective detaining member to control the ejector segment to eject one class of record material, and a normally effective detaining member to control the ejector segment to feed another class of record material; means to render the first-mentioned detaining member effective and to render the second-mentioned detaining member ineffective; and means under the control of that class of record material which is to be fed to disable the last-mentioned means.

33. In a machine of the class described, the combination with an ejecting mechanism, including a drive, adapted to different classes of record material; of a drive-control mechanism including a normally-ineffective detaining member to control the drive to enable the ejecting mechanism to eject one class of record material, and a normally effective detaining member to control the drive to enable the ejecting mechanism to feed another class of record material; means to render the first-named detaining member effective and the other ineffective; and a feeler-controlled mechanism to automatically disable the last-mentioned means.

34. In a machine of the class described; the combination with an ejecting mechanism, including a drive member therefor; of a control mechanism for the drive member, including a normally ineffective detainer to cooperate with the drive member to control the ejecting mechanism to eject one class of record material; a normally effective detainer to cooperate with the drive member to control the ejecting mechanism to feed another class of record material; means to shift the first-mentioned detainer to its effective position, and to shift the second-mentioned detainer to its ineffective position; means to hold said second-mentioned detainer in its ineffective position until after the ejection of the ejectable record material; and means to render the detainer-shifting means ineffective.

35. In a machine of the class described, the combination with an ejecting mechanism; of a control mechanism therefor, including a normally ineffective detainer to arrest the effective operation of the ejecting mechanism until such time as it will effect the ejection of one class of record material, and a normally effective detainer cooperable with the ejecting mechanism to limit the effective travel of the latter, whereby to feed another class of record material; a trip means to shift the first-mentioned detainer to its effective position and to shift the second-mentioned detainer to its ineffective position; means to hold the detainers where adjusted; the trip means adapted to restore the first-mentioned detainer to its ineffective position; and means to disable the trip means.

36. In a machine of the class described, the combination with an ejecting mechanism; of a control mechanism therefor, including a normally ineffective detainer to arrest the effective operation of the ejecting mechanism until such time as it will effect the ejection of one class of record material, and a normally effective detainer cooperable with the ejecting mechanism to limit the effective travel of the latter, whereby to feed another class of record material; a trip means to shift the first-mentioned detainer to its effective position and to shift the second-mentioned detainer to its ineffective position; means to hold the detainers where adjusted; the trip means adapted to restore the first-mentioned detainer to its ineffective position; a feeler; and means controlled by the feeler to disable the trip means.

37. In a machine of the class described; the combination with an ejecting mechanism, operable upon different classes of record material; of a normally ineffective detainer to control the ejector mechanism to eject one class of record material; a normally effective detainer to control the ejector mechanism to feed another class of record material; means to shift the first-mentioned detainer to its effective position, and to shift the second-mentioned detainer to its ineffective position; a feeler under the control of one class of record material to control the last-mentioned means; and means to hold said second-mentioned detainer in its ineffective position.

38. In a machine of the class described; the combination with a printing element; and means to take impressions therefrom on different classes of record material; of an ejector mechanism; a normally ineffective detainer cooperable with said ejector mechanism to control the latter to eject one class of record material; a normally effective detainer cooperable with the ejector mechanism to control the latter to feed another class of record material; means to shift the first-mentioned detainer to its effective position, and to shift the second-mentioned detainer to its ineffective position; means operable upon the second-named detainer to hold the detainers where adjusted; and means to release said second-mentioned detainer.

39. In a machine of the class described; the combination with an ejecting mechanism operable upon different classes of record material; of a normally ineffective detainer to cooperate with said ejecting mechanism to control it for the ejection of one class of record material; a normally effective detainer cooperable with the ejecting mechanism to control it to feed another class of record material; means to shift the first-mentioned detainer to its effective position, and to shift the second-mentioned detainer to its ineffective position; and means to trip said first-mentioned detainer to release the ejector mechanism.

40. In a machine of the class described; the combination with an ejecting mechanism operable upon different classes of record material; of a normally ineffective detainer cooperable with said ejecting mechanism to operable with the ejecting mechanism to control the latter to eject one class of record material; a normally effective detainer cooperable with the ejecting mechanism to control the latter to feed another class of record material; trip means operable to shift the detainers to their ineffective positions, alternately; means releasable by the ejecting mechanism to hold the second-named detainer in ineffective position; and means to shift the first-named detainer to effective position when the second-named detainer is shifted to ineffective position, and vice versa.

41. In a machine of the class described; the combination with an ejecting mechanism operable upon different classes of record material; of detainers separately cooperable with said ejecting mechanism to enable the latter to eject one class of record material; or to feed another class of record material; and means to automatically control the effectiveness of either detainer.

42. In a machine of the class described; the combination with an ejecting mechanism operable upon different classes of record material; of detainers separately cooperable with said ejecting mechanism to enable the latter to eject one class of record material; or to feed another class of record material; means to shift one of the detainers to effective position and another of the indicators to its ineffective position, and to trip the first-named detainer to enable the ejecting mechanism to eject one class of record material; and means controlled by another class of record material to prevent the last-named means from shifting the second-named detainer to ineffective position, whereby to constrain the ejecting mechanism to a feeding operation on such class of record material.

43. In a machine of the class described; the combination with an ejecting mechanism operable upon different classes of record material; of detainers separately cooperable with said ejecting mechanism to enable the latter to eject one class of record material; or to feed another class of record material; a cam to shift one of the detainers to effective position and another of the detainers to ineffective position; means to restore the first-effective position; means to restore the first-named detainer to ineffective position to release the ejecting mechanism to eject one class of record material; and means controlled by another class of record material to disable the cam, whereby the second-named detainer remains in effective positon to control the ejecting mechanism to feed such last-named record material.

44. In a machine of the class described; the combination with a printing element; and means to take impressions therefrom on an issuing check or on an insertable slip; of means to eject one class of record material and feed another class of record material, including a normally ineffective tension device; means controlled by one record material to render the tension device effective to feed the appropriate class of record material;

and other means to render the tension device effective to eject the appropriate class of record material.

45. In a machine of the class described, the combination with an ejecting mechanism, including an ejecting roll; a tension roll normally withdrawn therefrom; and means to turn one of said rolls to advance different classes of record material gripped therebetween; of separate means operable at different times in the operation of the machine to render the tension rolls effective to eject one class of record material, and to feed another class of record material; and a device controlled by one class of record to control the separate means.

46. In a machine of the class described, the combination with an ejecting mechanism, including an ejecting roll; a tension roll normally withdrawn therefrom; and means to turn one of said rolls to advance different classes of record material gripped therebetween; of separate means operable at different times in the operation of the machine to render the tension rolls effective to eject one class of record material, and to feed another class of record material; and automatic means to determine whether the ejecting mechanism shall eject or feed the record material depending upon the class to which it belongs.

47. In a machine of the class described; the combination with a printing element; and means to take impressions therefrom on different classes of record material; of means to feed one class of record material and to eject another class of record material, including a normally ineffective tension device; means automatic to render the tension device effective to feed the appropriate class of record material before the last impression is made thereon; and another means to render the tension device effective to eject the appropriate class of record material after the last impression has been made thereon.

48. In a machine of the class described; the combination with a printing element; and means to take impressions therefrom on different classes of record material; of means controllable by one class of record material to feed such record material and eject another class of record material, including a tension device; restraining means to hold the tension device normally ineffective; means to disable the restraining means before the first impression is made; separate restraining means to delay the effectivity of the tension device until after the last impression has been made on another class of record material; and means to disable said last-mentioned means.

49. In a machine of the class described; the combination with a printing element; and means to take impressions therefrom on different classes of record material; of means to feed one class of record material and to eject another class of record material, including a tension device; restraining means to hold the tension device normally ineffective; means to relieve the restraining means; means to shift the tension device to its effective position prior to the first impression on one class of record material; and another means to restrain the tension device against the influence of its shifting means until after the second impression on another class of record material.

50. In a machine of the class described; the combination with a printing element; and means to take impressions therefrom on different classes of record material; of means to feed one class of record material and to eject another class of record material, including a tension device; means to restrain the tension device in ineffective position; means to relieve the restraining means; means to shift the tension device to its effective position prior to the first impression on one class of record material; another means to restrain the tension device until after the second impression on another class of record material; and means controlled by the first-named class of record material to disable the second-mentioned restraining means.

51. In a machine of the class described; the combination with a printing element; and means to take impressions therefrom on different classes of record material; of means to feed one class of record material, and to eject another class of record material, including a tension device; means to restrain the tension device in ineffective position; means to release the restraining means; means to shift the tension device to its effective position prior to the first impression on one class of record material; another means to restrain the tension device until after the second impression on another class of record material; and a feeler to control the second-mentioned restraining means.

52. In a machine of the class described; the combination of means to feed one class of record material, and to eject another class of record material, including a tension device; means to shift the tension device to effective position; means to normally restrain said tension device in ineffective position; means to withdraw the restraining means; and means to detain the restraining means after said restraining means has been withdrawn.

53. In a machine of the class described; the combination of an ejecting means to feed one class of record material and to eject another class of record material, including a tension device; means to shift the tension device to its effective position; means to normally restrain said tension device in ineffective position; means to withdraw the restraining means; means to detain the restraining means in its withdrawn position; and means operable by the ejecting means to release said detaining means.

54. In a machine of the class described; the combination of an ejecting mechanism adapted to eject one class of record material, and to feed another class of record material, including a tension device; means to shift the tension device to its effective position; means to normally retain the tension device in its ineffective position; means to withdraw the retaining means; a normally ineffective restraining means also operable upon the tension device; and means to render said restraining means effective prior to the withdrawal of the first-mentioned retaining means.

55. In a machine of the class described; the combination with a check ejecting and slip feeding mechanism, including ejector rolls; and tension rolls; of means to shift the tension rolls into cooperative relation with the ejector rolls; and a plurality of means, operable at different times during the operation of the machine to retain the tension rolls in idle position.

56. In a machine of the class described; the combination with a check ejector and slip feeding mechanism, including ejector rolls; and tension rolls; of means to shift the tension rolls into cooperative relation with the ejector rolls; normally effective means to retain the tension rolls in idle position; normally ineffective means to restrain the tension rollers; and means to maintain said normally ineffective restraining means in its ineffective position on slip feeding operations.

57. In a machine of the class described; the combination with an ejecting and feeding mechanism, including ejecting rolls, and a tension device including supporting levers, and tension rolls mounted on the levers; of means to rock said levers to shift the tension rolls into cooperative relation with the ejecting rolls; a shaft having restraining fingers fast thereon to cooperate with the levers; an arm fast on said shaft; and a restraining lever cooperable with the arm to normally retain the tension rolls in idle position.

58. In a machine of the class described; the combination with an ejecting and feeding mechanism, including ejecting rolls, and a tension device, including supporting levers, and tension rolls mounted on the levers; of means to rock said levers to shift the tension rolls into cooperative relation with the ejecting rolls; a shaft having restraining fingers fast thereon to cooperate with the levers; an arm fast on said shaft; a restraining lever cooperable with the arm and normally effective to retain the tension rolls in idle position; means to withdraw the restraining lever to free the tension rolls for operation; means to latch the restraining lever in its withdrawn position; and means to free the restraining lever to enable it to operate the restraining fingers and retract the tension rolls to their ineffective position.

59. In a machine of the class described; the combination with an ejecting and feeding mechanism, including ejecting rolls, and a tension device, including tension rolls shiftable towards and from the ejecting rolls; of means to shift the tension rolls into cooperative relation with the ejecting rolls; restraining fingers adapted to return the tension rolls to and restrain them in their idle positions; a restraining lever to control the restraining fingers; means to withdraw the restraining lever to enable the tension rolls to shift towards the ejecting rolls; means to restore the lever to effective position; a second lever normally ineffective to restrain the tension rolls; means to rock the last-mentioned lever to and hold it in its effective position; and means controlled by the work to disable the last-mentioned means.

60. In a machine of the class described; the combination with an ejecting and feeding mechanism, including ejecting rolls, and a tension device, including tension rolls shiftable towards and from the ejecting rolls; of means to shift the tension rolls into cooperative relation with the ejecting rollers; restraining members to return the tension rolls to and retain them in their idle positions; a restraining lever cooperable with the restraining members and normally effective to operate the restraining members to return the tension rolls to and retain them in their idle positions; means to withdraw the restraining lever to enable the tension rolls to shift towards the ejecting rolls; a second restraining lever normally ineffective to restrain the tension rolls; means to render said second-restraining lever temporarily effective to restrain the tension rollers after the first-mentioned restraining lever is withdrawn; means to latch the first-mentioned restraining lever in withdrawn position; and means to release the first-mentioned restraining lever for operation.

61. In a machine of the class described, the combination with an ejecting and feeding mechanism operable on different classes of record material, and including ejector and tension rolls, and means to turn one of the rolls; of means to shift one of the rolls towards the other; a restraining member operable upon the shiftable roll; a plurality of separate means operable independently of each other upon the restraining member to retain the shiftable roll in idle position at different stages of operation of the machine; one of said separate means also adapted to restore the shiftable roll to its idle position; means to retract the last-named restoring and retaining means to idle position; and means controlled by the roll-turning means to latch such last-named restoring and retaining means in retracted position.

62. In a machine of the class described, the combination with an ejecting and feeding mechanism operable on different classes of record material, and including ejector and tension rolls, and means to turn one of the rolls; of means to shift one of the rolls towards the other; means to restore the shiftable roll to and hold it in its idle position, means to retract the restoring and holding means to idle position; means to latch the restoring and holding means in its idle position; a retaining means operable upon the shiftable roll to temporarily hold it in idle position during a part of that stage of operation of the machine wherein the restoring and holding means remains latched; and means operable near the end of the operation of the roll-turning means, to release the restoring and holding means for operation.

63. In a machine of the class described, the combination with an ejecting and feeding mechanism including driving and tension rolls, and means to turn one of the rolls; of means to shift one of the rolls towards the other; means to retract the shiftable roll and hold it in idle position; means to withdraw the roll-retracting and holding means; means to latch the roll-retracting and holding means in idle position; means to latch the roll-turning means in potentially effective position; means to temporarily detain the shiftable roll in idle position, effective subsequently to the withdrawal of the roll-retracting and holding means; means to trip the roll turning means, and release the temporary detaining means; means to limit the effective travel of the roll-turning means; and work-controlled means to disable the latch for the roll-turning means and the temporary detaining means.

64. In a machine of the class described; operable upon different classes of record material; the combination with a printing element; means to take impressions therefrom upon the record material and an ejecting means for one class of record material; of means to utilize the ejecting means as a feed mechanism, including means to enable the operation of the ejecting means at an earlier stage in the operation of the machine than when operating to eject a class of record material; and means to curtail the normal travel of the ejecting means when operating to feed a class of record material.

65. In a machine of the class described, operable upon different classes of record material; the combination with a printing element; means to take impressions therefrom upon the record material and an ejecting means for one class of record material; means controlled by another class of record material to change the time of operation of the ejecting means and to curtail its normal path of travel.

66. In a machine of the class described, the combination with a printing element; means to take impressions therefrom upon different classes of record material; feed means to advance one class of record material step by step at each operation of the machine; severing means for such record material; and means operable near the end of the operation of the machine, to eject the record material; of means controlled by another class of record material to advance the time of operation of the ejecting means; to disable the feeding and severing means; and to arrest the ejecting means intermediate its limits of travel.

67. In a machine of the class described, the combination with a printing element; means to take impressions therefrom on different classes of record material; feeding means to advance one class of record material relatively to the printing element; and means normally operable near the end of the operation of the machine, to eject such class of record material, including ejecting and tension rolls having relative movement towards and from each other, and means to shift one roll towards the other; of means to restore the last-named roll to and retain it in idle position; means to withdraw the restoring and retaining means; means to drive the rolls; normally idle means to temporarily detain the shiftable roll in idle position after its release by the restoring and retaining means; means to latch the roll-driving means in cocked position; means to trip the roll-driving means for operation; means under control of the roll-driving means to latch the restoring and detaining means in idle position; normally effective means to disable the feeding means for one class of record material, the temporary detaining means, and the means which latches the roll driving means in cocked position; a feeler controlled by another class of record material to maintain the disabling means in effective position; means operable by the roll restoring and retaining means to return the disabling means to effective position, and the feeler to its retracted position; means to latch the feeler in retracted position, upon its return; a manipulative member; and means controlled thereby to disengage the feeler from its latch and hold the feeler in retracted position.

68. In a machine of the class described, the combination with feeding means to advance one class of record material; and means normally operable near the end of the operation of the machine to eject such record material, including drive and tension rolls, and means to drive the rolls; of means to normally retain the tension roll ineffective; means to delay the operation of the tension roll after its release by the holding means; means controlled by another class of record material and operable at each operation of the machine to determine the effectiveness of the feeding means for the first-named class of record material, and the delaying means; means to withdraw the tension roll retaining means and retract the means controlled by the second-named class of record material; a manipulative member; and means controlled thereby to retain the means controlled by the second-named class of record material in retracted position.

69. In a machine of the class described, the combination with feeding means to advance one class of record material; and means normally operable near the end of the operation of the machine to eject such record material, including drive and tension rolls, and means to drive the rolls; of means to normally retain the tension roll ineffective; means to delay the operation of the tension roll after its release by the holding means; means to disable the feeding means for the first-named class of record material, and the means which delays the operation of the tension roll after its release by the holding means; a feeler controlled by another class of record material, to determine whether or not the disabling means shall become effective; means to project the feeler; means to withdraw the tension roll retaining means and retract the feeler to its normal position; means to latch the feeler in retracted position; a manipulative device; and means controlled thereby to disengage the feeler and latch and hold the feeler retracted.

70. In a machine of the class described, the combination with feeding means to advance one class of record material; and means normally operable to eject such record material, including drive and tension rolls, and means to drive the rolls; of means to restore the tension roll to and normally retain it in ineffective position; means to withdraw the restoring and retaining means; means controlled by the drive means for the rolls, to latch the withdrawing and restraining means in idle position; normally effective means to arrest the travel of the driving means for the rolls; means normally effective to disable the last-named means; means to postpone the operation of the tension roll after the withdrawal of the restoring and retaining means therefor; a means to disable the feeding means for said class of record material, the means which postpones the operation of the tension roll, and the means which arrests the travel of the driving means for the rolls; means controlled by another class of record material to determine the effectiveness of the disabling means; a manipulative member; means controlled thereby to retain the last-named means normally retracted; and means operated by the tension roll restoring and retaining means to return the determining means to retracted position.

71. In a machine of the class described, the combination with a receptacle to receive an insertable slip; of means to convert the mouth end of the receptacle into an issuing check chute when no slip is in the receptacle.

72. In a machine of the class described, the combination with a receptacle to receive an insertable slip; of a gate in the receptacle; and means effective, when no slip is in the receptacle, to open the gate to convert the receptacle into a chute for an issuing strip.

73. In a machine of the class described, the combination with a receptacle to receive an insertable slip; of a gate in the receptacle; a movable guide for an issuing strip; and means on the movable guide to open the gate to convert the receptacle into a chute for the issuing strip.

74. In a machine of the class described, the combination with a receptacle to receive an insertable slip; of a gate in the receptacle; a movable guide for an issuing strip; means on the movable guide to open the gate to convert the receptacle into a chute for the issuing strip; and means controlled by an inserted slip to prevent operation of the last-named means.

75. In a machine of the class described, the combination with a receptacle to receive an insertable slip; of a gate in the receptacle; means effective when no slip is in the receptacle to open the gate to convert the receptacle into a chute for an issuing strip; and means controlled by the inserted slip to render the last-named means ineffective.

76. In a machine of the class described, the combination with a receptacle to receive an insertable slip; of a gate in the receptacle; means effective when no slip is in the receptacle to open the gate to convert the receptacle into a chute for an issuing strip; and a feeler to contact the inserted slip, when in the receptacle, to arrest the operation of the gate opening means.

77. In a machine of the class described, the combination with a receptacle to receive an insertable slip; of a gate in the receptacle; a movable guide for an issuing strip; means on the movable guide to open the gate to convert the receptacle into a chute for the issuing strip; and means controlled by the inserted slip to arrest the movement of the movable guide and gate opening means.

78. In a machine of the class described, the combination with a receptacle to receive an insertable slip; of a gate in the receptacle; a movable guide for an issuing strip; means on the movable guide to open the gate to convert the receptacle into a chute for the issuing strip; a feeler to contact an insertable slip, when in the receptacle; and mechanism controlled by the feeler to render the movable guide immovable, to prevent opening of the gate.

79. In a machine of the class described, the combination with a receptacle to receive an insertable slip; of a gate in the receptacle; a movable guide for an issuing strip; a finger on the movable guide; and means to move the guide only in the absence of an insertable slip, said finger adapted to contact the gate when the guide is moved to open the gate, to enable the guide to move into position to guide the issuing strip into the receptacle.

80. In a machine of the class described, the combination with a receptacle to receive an insertable slip; of a gate in the receptacle; a movable guide for an issuing strip; a finger on the movable guide; means to move the guide only in the absence of an insertable slip, said finger adapted to contact the gate when the guide is moved to open the gate, to enable the guide to move into position to guide the issuing strip into the receptacle; and a feeler to contact an insertable slip, when placed in position in the receptacle, to prevent operation of the last-named means.

81. In a machine of the class described, the combination with a receptacle to receive an insertable slip; of a gate in the receptacle; a movable guide for an issuing strip; a finger on the movable guide; means to move the guide only in the absence of an insertable slip, said finger adapted to contact the gate when the guide is moved to open the gate, to enable the guide to move into position to guide the issuing strip into the receptacle; a cam to actuate the last-named means; and a feeler to cooperate with an inserted slip, when placed in the receptacle, to render the cam inactive.

82. In a machine of the class described, the combination with a receptacle to receive an insertable slip; of a gate in the receptacle; a movable guide for an issuing strip; a finger on the movable guide; means to move the guide only in the absence of an insertable slip, said finger adapted to contact the gate when the guide is moved to open the gate, to enable the guide to move into position to guide the issuing strip into the receptacle; a cam to actuate the last-named means; a clutch to drive the cam; a feeler to cooperate with an inserted slip, when placed in the receptacle; and connections between the feeler and the clutch operable to control the clutch to render the cam inactive.

In testimony whereof I affix my signature.

WILLIAM H. ROBERTSON.